(12) United States Patent
Avidan

(10) Patent No.: US 6,608,895 B1
(45) Date of Patent: Aug. 19, 2003

(54) METHOD OF ANTICIPATORY DIALING

(75) Inventor: Moshe Avidan, Rishon Lezion (IL)

(73) Assignee: Tadiran Telecom Business Systems, Ltd., Petach-Tikva (IL)

( * ) Notice: Subject to any disclaimer, the term of this patent is extended or adjusted under 35 U.S.C. 154(b) by 0 days.

(21) Appl. No.: 09/186,199

(22) Filed: Nov. 4, 1998

(51) Int. Cl.⁷ .............................................. H04M 1/00
(52) U.S. Cl. .............................. 379/355.01; 379/356.01
(58) Field of Search ............................. 379/354, 355.01, 379/355.02, 355.05, 356.01, 359

(56) References Cited

U.S. PATENT DOCUMENTS

| | | | |
|---|---|---|---|
| 4,341,929 A | * 7/1982 | Alexander et al. | 379/354 |
| 4,633,041 A | * 12/1986 | Boivie et al. | 379/354 |
| 5,263,159 A | 11/1993 | Mitsui | |
| 5,267,308 A | 11/1993 | Jokinen et al. | |
| 5,553,122 A | 9/1996 | Haber et al. | |
| 5,592,546 A | * 1/1997 | Takahashi | 379/355.05 |
| 5,642,411 A | 6/1997 | Theis | |
| 5,644,657 A | 7/1997 | Capps et al. | |
| 5,708,804 A | * 1/1998 | Goodwin et al. | 379/355.09 |
| 5,982,876 A | * 11/1999 | Albesa | 379/354 |
| 6,097,808 A | * 8/2000 | Chang | 379/355.05 |

\* cited by examiner

Primary Examiner—Forester W. Isen
Assistant Examiner—Jefferey Harold
(74) Attorney, Agent, or Firm—Nath&Associates PLLC; Harold L. Novick; Marvin C. Berkowitz

(57) ABSTRACT

A method of anticipating an access code such as a telephone number. A database of reference access codes is provided. As each character of a new access code is dialed, the database is searched for reference access codes that have the same leading digits. If one match is found, that matching reference access code is displayed to allow the user to call it without dialing new characters. If more than one match is found, the matching reference access codes are ranked according to a selection criterion. Preferably, the database includes an indication of the history of usage of the reference access codes and the selection criterion is based on the usage histories of the reference access codes, for example, according to their times of most recent usage, and also according to other criteria such as current day of the week. The highest ranking reference code is displayed. If the user completes dialing with no match found, then the newly dialed access code is included in the database.

19 Claims, 3 Drawing Sheets

METHOD OF ANTICIPATORY DIALING

FIELD AND BACKGROUND OF THE INVENTION

The present invention relates to telephone systems and similar communication systems and, more particularly, to a method for rapidly entering a frequently used access code such as a telephone number.

Telephone sets are known that include memories for storing and retrieving frequently dialed telephone numbers. Each frequently dialed number is associated with its own button, which is pressed by the user to dial that number. Because of the limited amount of space on the telephone set's keypad, such systems are limited to only a small number (typically 10–20) of frequently dialed numbers.

There exist computer programs that attempt to complete strings keyed into the keyboard of a computer by a user, based on stored lists of strings. For example, Internet Explorer 4.0 suggests yet-to-be-entered characters of Internet URLs, based on a database of previously entered URLs. In order for such a suggestion to be made, the selection must be unambiguous. The portion of the string already keyed in must be the leading characters of only one of the URLs in the database. For example, if the database includes the URLs http://www.fresh.com and http://www.froth.com and the user keys in the string "http://www.fr", Internet Explorer 4.0 lacks a criterion for deciding which of the two possibilities, "esh.com" and "oth.com" to use to complete the URL.

It would be useful to provide telephone sets with a capability similar to this feature of Internet Explorer 4.0. At the very least, the provision of not-yet-dialed digits of telephone numbers would reduce the number of dialing mistakes committed by users. In addition, it would be very useful to provide a criterion for selecting one telephone number from among two or more telephone numbers that share the already-dialed lead digits. One particularly useful criterion would be the history of prior usage of the stored telephone numbers, i.e., a criterion based on when (dates and/or times), or in what order, the stored telephone numbers have been dialed in the past. For example, if the stored telephone numbers were accessed in a last-in-first-out manner, a user could redial a busy telephone number merely by dialing the first digit of the number. If a user tends to dial particular telephone numbers on specific days of the week, then a separate last-in-first-out list of telephone numbers could stored for each day of the week. The search then would be performed, first in the list corresponding to the current day of the week, and then in the other lists.

There is thus a widely recognized need for, and it would be highly advantageous to have, a method of anticipatory telephone dialing that is based on the history of previous dialing.

SUMMARY OF THE INVENTION

According to the present invention there is provided, in a communications system wherein a user initiates a session by entering one of a plurality of access codes, each of the access code having a certain number of characters greater than 1, a method for completing entry of a target access code after the user has entered a number N of the characters of the target access code, N being at least 1 but less than the number of characters in the target access code, the method including the steps of: (a) providing a database of a plurality of reference access codes, each of the reference access code having a plurality of characters; (b) identifying, from among the plurality of reference access codes, at least one candidate access code having at least N+1 characters, a first N of the at least N+1 characters being identical to the N characters entered by the user; and (c) if a plurality of the candidate access codes are identified: (i) providing a selection criterion for selecting only one of the plurality of the candidate access codes, and (ii) selecting one of the plurality of candidate access codes to use to complete the target access code, the selecting being based on the selection criterion.

The present invention is applicable to any communication system in which a user enters an access code in order to acquire a communication link to another user. The access code typically is a string of characters. Because the primary application of the present invention is to telephony, the invention is described herein in terms of telephony: the access codes described herein are telephone numbers, which are strings of digits, and the user enters the access code by dialing.

According to the present invention, a telephone set with a visual display automatically completes telephone numbers as the telephone numbers are dialed, based on a criterion such as prior dialing history. In the simplest embodiment of the present invention, a memory is provided in which an ordered stack of telephone numbers is maintained. These internally stored telephone numbers are also referred to herein as "reference" telephone numbers. Whenever a complete telephone number is dialed by a user, that telephone number is entered into the top of the stack, pushing the previously entered reference telephone numbers down the stack. When a user begins to dial a new telephone number (also referred to herein as the "target" telephone number), each digit of the new telephone number is displayed on the visual display. As soon as each digit of the new telephone number is dialed, a controller inside the telephone searches down the stack for the first previously dialed telephone number whose initial digits match the newly dialed digits. If such a previously dialed telephone number is found, the remaining digits of this previously dialed telephone number are displayed next to the newly dialed digits, preferably in a different format (e.g., inverse video or a different color) so that the user can tell which digits were dialed and which digits were supplied by the telephone set. At any time during dialing, if the user recognizes the displayed number as the desired telephone number, then the user pushes a "dial" button to dial the balance of the displayed number. In some telephone sets configured to implement the present invention, this "dial" button is a special-purpose button separate from the standard telephone keypad. In other telephone sets configured to implement, the present invention, one of the keys of the standard keypad, for example the pound (#) key, is used as the "dial" button. Otherwise, the user dials the entire new telephone number in the conventional manner. In this way, telephone numbers that were previously dialed recently enough to still be on the stack are dialed more quickly than less recently dialed telephone numbers.

According to preferred embodiments of the present invention, a telephone set or similar apparatus is configured to anticipate a full newly dialed telephone number in a more flexible way. For example, the telephone set described above that automatically completes newly dialed telephone numbers gives preference to more recently dialed telephone numbers over less recently dialed telephone numbers. There are applications in which it would be desirable to assign other preferences to the stored telephone numbers. For example, in telemarketing, it is desirable to give preference to less recently dialed telephone numbers over more recently dialed telephone numbers, so that customers can be accessed in a round robin fashion.

Therefore, instead of merely storing telephone numbers as they are dialed, according to preferred embodiments of the present invention, each dialed telephone number is stored along with the time at which it was dialed. This time is referred to herein as the "time of most recent usage". When a user begins to dial a new telephone number, each time a digit of the new telephone number is dialed, the new digit string is compared to the initial digits of all the stored telephone numbers. If only one stored telephone number has leading digits identical to the dialed digits, then that stored telephone number is used to complete the new telephone number, as in the simple embodiment of the present invention. If two or more stored telephone numbers have leading digits identical to the dialed digits, then the stored telephone number to substitute for the new telephone number is selected according to a criterion that takes into account the times of most recent usage of the candidate stored telephone numbers. If none of the stored telephone numbers have leading digits identical to the dialed digits, or if the user chooses to override the substitution, then the newly dialed telephone number is added to the database of stored telephone numbers, along with the current time as the new telephone number's time of most recent usage.

Whenever a new telephone number is dialed, an age of most recent usage is computed for each stored telephone number by subtracting the time of most recent usage from the current time. If this age exceeds a threshold (e.g., one year), the stored telephone number is deleted. The simplest selection criteria also are based on the age of most recent usage. Selecting the youngest candidate telephone number emulates the simple embodiment of the present invention. Selecting the oldest candidate telephone number provides the round robin selection desired for telemarketing. Other selection criteria are described below.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is of a method for the semiautomatic ("anticipatory") entry of an access code, such as a telephone number, to a communications system, based on the history of prior usage and other criteria. The present invention can be used to increase the speed with which a user dials frequently used telephone numbers.

The principles and operation of anticipatory dialing according to the present invention may be better understood with reference to the drawings and the accompanying description.

The preferred representation of the time of most recent usage has two components: date (year, month, day of month) of most recent usage and time of day (expressed as minutes since midnight) of most recent usage. Optionally, the date component includes the day of the week of most recent usage. In the absence of a stored day of the week, the day of the week is computed from the year, the month, and the day of the month.

Similarly, the preferred representation of the current time has two components, analogous to the two components of the time of most recent usage: current date (year, month, day of month) and current number of minutes since midnight. The age of most recent usage is expressed in minutes, and is computed by converting the time of most recent usage to time since midnight of January 1 of the year of most recent usage, converting the current time to minutes since midnight on January 1 of the current year, adding to the current time the number of minutes (525,600 for an ordinary year of 365 days, 527,040 for a leap year of 366 days) in the years from the year of most recent usage to the current year (0 years if the year of most recent usage is this year, 1 year if the year of most recent usage is last year, etc.), and subtracting the time of most recent usage from the current time.

Figure 1:
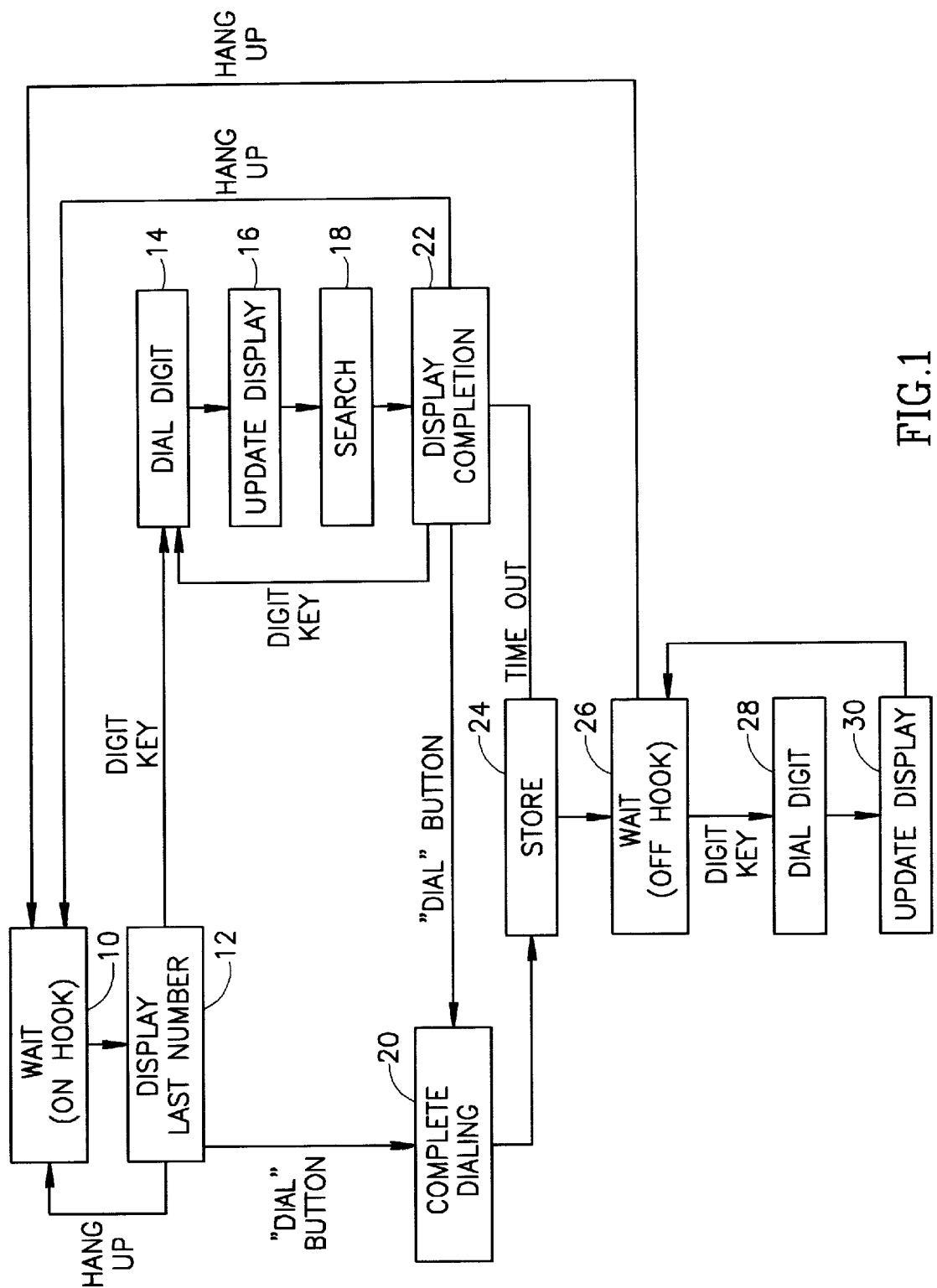
FIG. 1 is a high level flow diagram of the present invention.

Referring now to the drawings, FIG. 1 is a high level flow diagram of the present invention. A telephone set, when not in use, is in an on-hook wait state (block 10). When the receiver is taken off the hook by the user, the telephone set is placed in a ready state in which the most recently dialed telephone number is displayed (block 12). If the user pushes the "dial" button, the most recently dialed telephone number is forwarded to DTMF encoding circuitry for dialing (block 20) and is stored in the database (block 24) along with the current time as its time of most recent usage.

If the user wishes to dial a new telephone number, the user pushes the key corresponding to the first digit of the new telephone number. This digit is forwarded to the DTMF encoding circuitry for dialing (block 14) and displayed (block 16). The database is searched for the reference telephone numbers with the same first digit (block 18). If one reference telephone number with the same first digit is found, then the new telephone number is completed using all but the first digit of the reference telephone number, and is displayed accordingly (block 22). If two or more reference telephone numbers with the same first digit as the dialed digit are found, then the selection criterion is used to rank these candidate telephone numbers, and the candidate telephone number with the highest rank is used to complete the new telephone number (block 22). In either case, the explicitly dialed digits are displayed differently from the remaining digits, to allow the user to distinguish the digits that he or she has dialed from the digits that have been suggested by the present invention. For example, the remaining digits may be displayed in inverse video mode. (Note that the most recently dialed telephone number is displayed in block 12 in the same format as is used to display the remaining digits in block 22.) If no reference telephone numbers with the same first digit as the dialed digit are found, then only the explicitly dialed digits are displayed.

If the user is satisfied with the displayed telephone number, including the digits that have been suggested by the present invention, then the user pushes the "dial" button to have the suggested digits transmitted to the telephone system by the DTMF encoding circuitry (block 20). The full transmitted telephone number also is stored in the database along with the current time as its time of most recent usage (block 24).

If the user is not satisfied with the displayed telephone number, then the user pushes the key corresponding to the next digit of the desired telephone number. The new digit is transmitted to the telephone system by the DTMF encoding circuitry (block 14) and displayed (block 16); and the database is searched for reference telephone numbers whose first digits match the string of digits that have been dialed explicitly by the user (block 18). This process is repeated until either the present invention succeeds in recommending the desired telephone number to the user or the user dials the entire new telephone number. If, after pushing a key, the user pauses for longer than the standard "interdigit time-out" threshold ("time out") before either pushing the "dial" button, pushing another key or hanging up, this is interpreted to mean that the user has established an ongoing conversation by dialing all the necessary digits explicitly. Therefore, the explicitly dialed digits are stored in the database as a new reference telephone number, along with the current time as the time of most recent usage (block 24). In other words, the new telephone number is stored automatically while the user is conversing.

At any time before the dialing sequence is completed, either before dialing begins (block 12) or in the middle of dialing (block 22), the user can abort the process without updating the database (block 24) by simply hanging up, thereby returning the telephone set to the on-hook wait state (block 10). After the full telephone number has been transmitted to the telephone system (block 20) and stored (block 24), the telephone set is in an off-hook wait state (block 26). Now, if the user dials additional digits (e.g., the digits of extension numbers), these digits are transmitted to the telephone system by the DTMF encoding circuitry (block 28) and displayed (block 30) without being stored.

The time required by a user to dial a single digit is between 0.5 seconds (fast user) and 3.0 seconds (slow user). Hence, a fast user can dial a seven digit telephone number in 3.5 seconds, whereas a slow user needs 21 seconds to dial a seven digit telephone number. Under the current invention, if the desired telephone number is recommended after three digits have been dialed explicitly, the fast user saves 1.5 seconds and the slow user saves 9 seconds.

Alternatively, the telephone set is configured with a "pause time-out" threshold that is shorter than the interdigit time-out threshold. If, at any time in dialing, the user pauses for longer than the pause time-out threshold, then the digits suggested by the present invention are transmitted to the telephone system. In other words, the full displayed telephone number is dialed, and stored in the database, without the user having to push the "dial" button.

Whenever a telephone number is stored in the database, if that telephone number already appears in the database, the storage is effected by replacing the time of most recent usage with the current time. Otherwise, a new entry is created in the database.

As noted above, the simplest selection criteria are based on only the ages of most recent usage. To dial anticipatorily in last-in-first-out order, the negative of the age of most recent usage is used as the rank. The "telemarketing" selection criterion uses the age of most recent usage directly as the rank.

Figure 2:
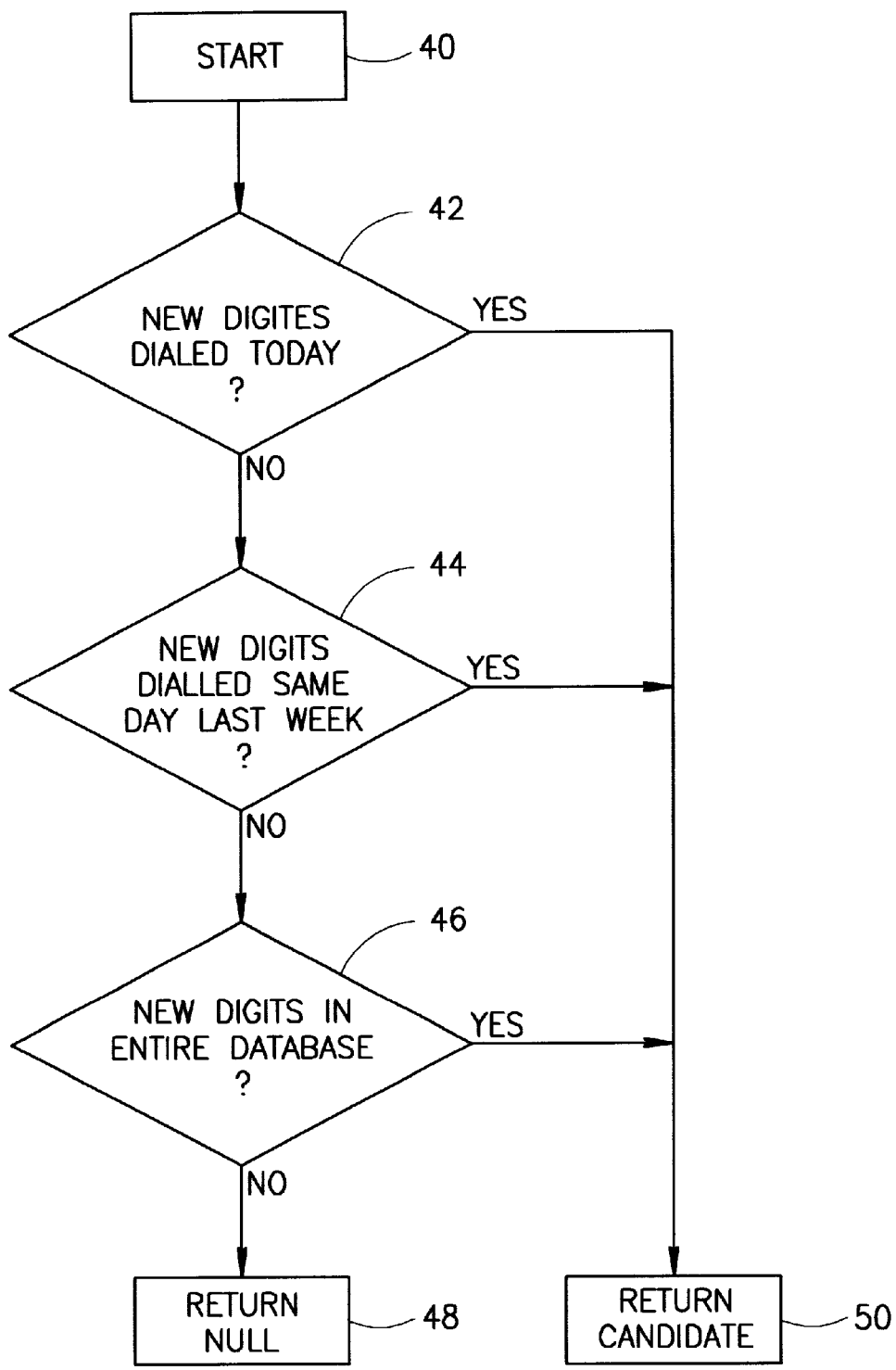
FIG. 2 is a flow diagram of a selection criterion.

FIG. 2 is a flow diagram of a somewhat more sophisticated selection criterion, for anticipatory dialing of telephone numbers associated with particular days of the week. To implement this selection criterion, the date component of the time of most recent usage must include the day of week of the most recent usage. Upon entry to the search (block 40), the database is searched for a reference telephone number that was dialed today and whose leading digits match the explicitly dialed digits. If such a reference telephone number is found (block 42), then that reference telephone number is returned as the candidate telephone number (block 50). If two or more such reference telephone numbers are found, then the one with the youngest age of most recent usage is returned as the candidate telephone number (block 50). If no such reference telephone number is found, then the database is searched similarly for a reference telephone number whose leading digits match the explicitly dialed digits and which was dialed on this day last week (same day of the week as today; age of most recent usage less than or equal to 11,520 minutes) (block 44). If a suitable candidate telephone number is found, that candidate telephone number is returned (block 50). If no suitable candidate is found, then the entire database is searched similarly (block 46). If a suitable candidate telephone number is found, that candidate telephone number is returned (block 50). If no suitable candidate is found, a null string is returned (block 48). The subsearches of reference telephone numbers dialed the same day last week and of the remainder of the database are conducted in the same way as in the current cache: multiple candidates are ranked according to youth.

As an example of the functioning of the selection criterion of FIG. 2, consider a user who, on a Tuesday, has dialed:
926-5445 at 9:30
925-9876 at 9:35
876-3456 at 9:36

Figure 3:
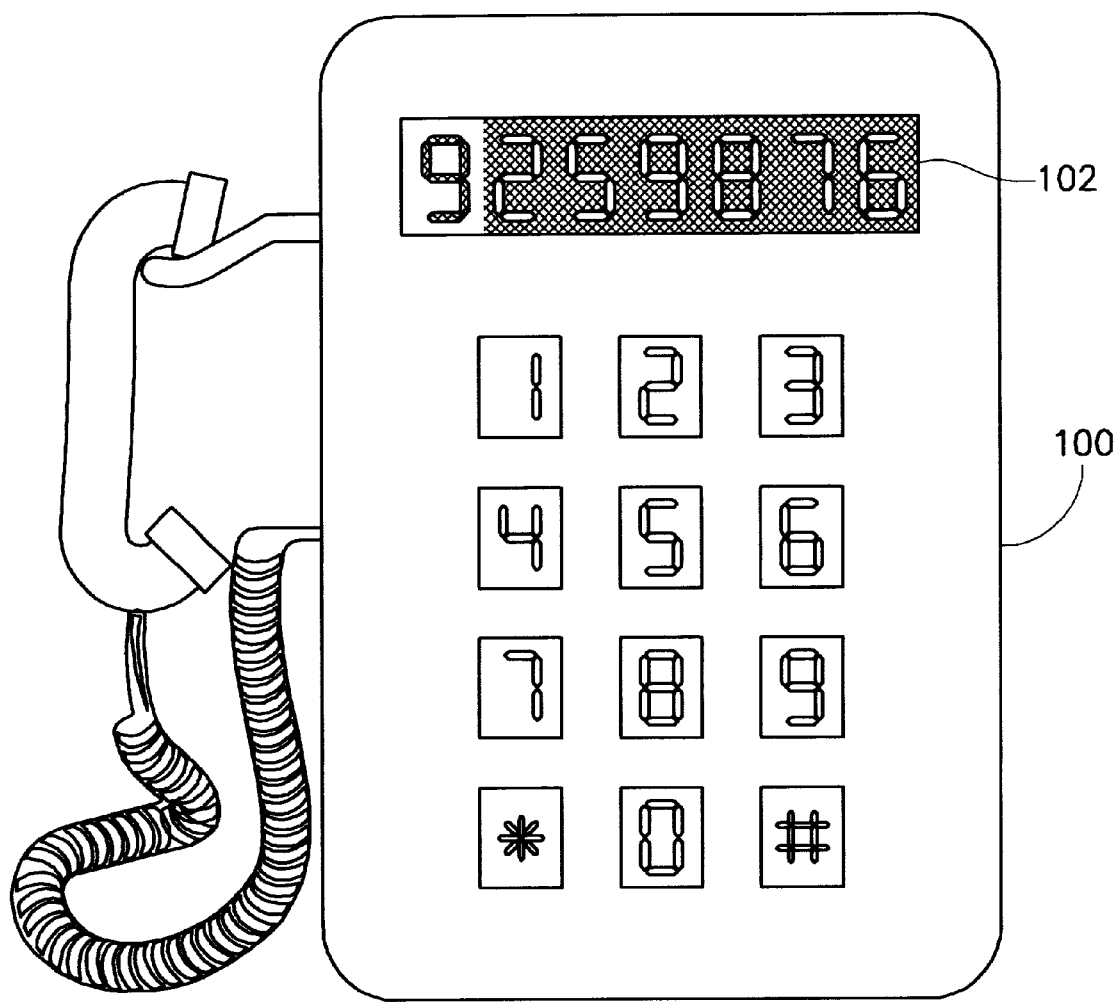
FIG. 3 shows a telephone set with an explicitly dialed digit and six anticipated digits displayed differently.

On the previous Tuesday, the user had dialed 926-0576 at 9:40. Now, at 9:40, the user wishes to dial 926-0576 again. The user picks up the telephone receiver. "8763456" is displayed in inverse video. The user dials "9". "9259876" is displayed, with "259876" in inverse video. FIG. 3 shows a telephone set 100, configured according to the present invention, in which "9259876" is displayed in this manner on a display screen 102. The user dials "2". "9259876" remains in the display, but with only "59876" in inverse video. The user dials "6". "9265445" is displayed, with "5445" in inverse video. The user dials "0". "9260576", the desired telephone number, is displayed, with "576" in inverse video. The user now pushes the "dial" button to initiate the telephone call.

The utility of other selection criteria, and algorithms for their implementation, will be readily apparent to those skilled in the art. For example, in addition to the day of the week, or instead of the day of the week, the selection criterion may be based on time of day, or on the nature of the date (holiday, vacation, etc.).

Telephony hardware that facilitates the implementation of the present invention is well-known in the art. See, for example, Haber et al., U.S. Pat. No. 5,553,122, which is incorporated by reference for all purposes as if fully set forth herein, and which describes a device for terminating a telephone line and dialing under the control of a microcontroller. The user chooses from among several selection criteria of the present invention by pressing the "dial" button while the telephone set is in the on-hook state. The display goes blank in response to the user pressing the dial button, and the user then presses the key whose number corresponds to the desired selection criterion. If the telephone set is provided with a multi-line display, a menu of selection criteria is displayed, and the user presses the key whose number corresponds to the desired menu item. The user then pushes the "dial" button again to store the selection in memory. Alternatively, a telephone set configured to support the present invention is provided with a switch that the user sets to choose the desired selection criterion.

While the invention has been described with respect to a limited number of embodiments, it will be appreciated that many variations, modifications and other applications of the invention may be made.

What is claimed is:

1. In a communications system that includes a data input device and a display device that displays data entered on the data input device, wherein a user initiates a session by entering a desired one of a plurality of access codes, each of the access codes having a certain number of characters greater than 1, a method for completing entry of a target access code after the user has entered a number N of the characters of the target access code, N being at least 1 but less than the number of characters in the target access code, and for initiating the session, the method comprising the steps of:

(a) providing a database of a plurality of reference access codes, each of said reference access codes having a plurality of characters;

(b) initially entering a number N of the characters of the target access code in the data input device and displaying the entered numbers on the display;

(c) identifying, from among said plurality of reference access codes, at least one candidate access code having at least N+1 characters, a first N of said at least N+1 characters being identical to the N characters entered by the user;

(d) displaying on the display those characters of the candidate access code that are in excess to the entered N characters;

(e) if a plurality of said candidate access codes are identified:
  (i) providing a selection criterion for selecting only one of said plurality of said candidate access codes, and
  (ii) selecting one of said plurality of candidate access codes to use to complete the target access code, said selecting being based on said selection criterion;

(f) if the displayed characters are the characters of the desired access code, initiating the session;

(g) if the displayed characters are not the characters of the desired access code, entering at least an additional character in the data input device and displaying said entered character or characters on said display device;

(h) repeating steps "c" through "g" until the desired access code is displayed or until all of the characters of the desired access code have been entered, wherein N is now the initially entered characters and the entered additional character or characters;

wherein the access code is a telephone number to be dialed by the communication system; and further comprising the step of:

(i) automatically dialing the candidate telephone number when a predetermined time has elapsed after a character has been entered.

2. The method of claim 1, wherein said database includes, for each said reference access code, an indication of a history of prior usage, and wherein said selection criterion is based on said indication of said history of prior usage.

3. The method of claim 2, wherein said indication of said history of prior usage includes, for each said at least one reference access code, a time of most recent usage.

4. The method of claim 3, further comprising the step of:

(d) replacing said time of most recent usage of said selected candidate access code with a current time.

5. The method of claim 3, wherein, if a plurality of said at least one candidate access code is identified, said selecting of one of said at least one candidate access code is effected by steps including assigning a rank to each of said plurality of candidate access codes, said one of said plurality of candidate access codes that is selected then being said candidate access code having a highest said rank.

6. The method of claim 5, further comprising the step of:
  (i) for each of said plurality of reference access codes, assigning an age of most recent usage based on said time of most recent usage.

7. The method of claim 6, wherein said rank decreases with said age of most recent usage.

8. The method of claim 5, wherein said time of most recent usage includes a time of day of most recent usage, and wherein said rank is based on said time of day of most recent usage and on a current time of day.

9. The method of claim 5, wherein said time of most recent usage includes a day of week of most recent usage, and wherein said rank is based on said day of week of most recent usage and on a current day of week.

10. The method of claim 5, wherein said time of most recent usage includes a date of most recent usage, and wherein said rank is based on said date of most recent usage and on a current date.

11. The method of claim 3, further comprising the steps of:
  (i) entering the entire target access code, by the user; and
  (j) if none of said plurality of reference access codes is identical to the target access code, inserting the target access code in the database as a new reference access code having a current time as said time of most recent usage thereof.

12. The method of claim 3, further comprising the step of:
  (i) for each of said plurality of reference access codes, assigning a age of most recent usage based on said time of most recent usage.

13. The method of claim 12, further comprising the steps of:
  (j) providing a deletion age; and
  (k) removing from said database each of said plurality of reference access codes for which said age of most recent usage exceeds said deletion age.

14. The method of claim 2, wherein said providing of said database is effected by steps including storing access codes entered by the user in an ordered stack, said order providing said indication of said history of prior usage.

15. The method of claim 1, wherein, if a plurality of said at least one candidate access code is identified, said selecting of one of said at least one candidate access code is effected by steps including assigning a rank to each of said plurality of candidate access codes, said one of said plurality of candidate access codes that is selected then being said candidate access code having a highest said rank.

16. The method of claim 1, further comprising the steps of:
  (i) entering the entire target access code, by the user; and
  (j) if none of said plurality of reference access codes is identical to the target access code, inserting the target access code in the database as a new reference access code.

17. The method of claim 1, wherein said providing of said selection criterion is effected by steps including:
  (A) providing a plurality of candidate criteria; and
  (B) selecting one of said candidate criteria as said selection criterion.

18. The method of claim 1 wherein the method is for dialing a telephone number on a communications device having a dial button, and wherein said session is initiated by activating said dial button.

19. The method of claim 18, wherein said entered characters are displayed in a first format and said excess characters of the candidate access code are displayed in a second format which is different from said first format.

* * * * *